(12) United States Patent
Chakrabarty (10) Patent No.: US 10,956,797 B1
(45) Date of Patent: Mar. 23, 2021

(54) EXTRACTING MARKER-OUTLINED FREE-FORM AREAS OF A DOCUMENT

(71) Applicant: LEXMARK INTERNATIONAL, INC., Lexington, KY (US)

(72) Inventor: Saikat Chakrabarty, Kolkata (IN)

(73) Assignee: LEXMARK INTERNATIONAL, INC., Lexington, KY (US)

(*) Notice: Subject to any disclaimer, the term of this patent is extended or adjusted under 35 U.S.C. 154(b) by 0 days.

(21) Appl. No.: 16/666,637

(22) Filed: Oct. 29, 2019

(51) Int. Cl.
*G06K 15/02* (2006.01)

(52) U.S. Cl.
CPC ..... *G06K 15/1822* (2013.01); *G06K 15/1809* (2013.01); *G06K 15/1882* (2013.01)

(58) Field of Classification Search
None
See application file for complete search history.

(56) References Cited

U.S. PATENT DOCUMENTS

| | | | | |
|---|---|---|---|---|
| 2005/0265624 | A1* | 12/2005 | Washio | H04N 1/4055 |
| | | | | 382/273 |
| 2008/0165376 | A1* | 7/2008 | Tomohiro | G06T 7/13 |
| | | | | 358/1.9 |

* cited by examiner

*Primary Examiner* — Lennin R Rodriguezgonzalez (57) ABSTRACT

A method for extracting and printing a selected area of a document, comprising steps of: receiving an image to select the area for printing, extracting parameters of an outline drawn with a specific colored ink around the selected area, storing one or more of the extracted parameters to create an outline mask to identify the selected area enclosed within the outline, and retrieving the selected area within the outline by performing outline removal using the outline mask and printing the selected area.

20 Claims, 12 Drawing Sheets

EXTRACTING MARKER-OUTLINED FREE-FORM AREAS OF A DOCUMENT

BACKGROUND

1. Field of the Invention

The present invention relates to image synthesizing and printing, and more particularly to synthesizing a cropped image and printing same. The present invention relates also to an imaging apparatus for image cropping and synthesizing.

2. Description of the Related Art

An image cropping function using digital tools and software such as, Adobe Photoshop, Microsoft Paint, etc. has been known in the art, wherein parts of an electronic images are cropped and pasted, for printing hard copies of the electronic images. To do that, the user first needs to scan the document, crop the required section using some third-party free-form cropping software (like Adobe Photoshop, Microsoft Paint, etc.), and paste the cropped image to another file and then take a printout of the same. Thus, the process involves multiple steps and requires some level of knowledge to use the software. Furthermore, it is very difficult to accurately outline and crop shapes, having several sharp edges, using a mouse. Many a times, users want to print just a particular section of a document instead of the whole document. These sections might often be free-form shapes rather than regular geometrical shapes like rectangle or square. For example, a user might want to print an article from a magazine or an image from a chart or a specific portion of a report, etc.

Accordingly, the inventor recognizes that it will be rather beneficial to draw an outline on the document directly using a pen, which is much easier, accurate and fast since humans tend to have better control while marking on paper with a pen than on a screen with a mouse. Conventionally, users cannot just take documents to a copier and get the desired section of the document cropped out. Besides that, cropping a complicated free-form shape (for example, a human figure) using a mouse can turn out to be a very tedious and time-consuming job.

SUMMARY

The present disclosure relates generally to method for extracting and printing a selected area and more particularly to printing an area marked inside an outline. The techniques of the present disclosures a method, to get a section of a document printed. An application running inside the device or running as service invoked via cloud for example, simply accepts an outlined digital document as input and outputs an image containing the section lying inside the marked outline, which eventually gets printed. For extracting and printing, the document having an area enclosed inside an outline is received and scanned, thereafter the area inside the outline is extracted for printing. For extracting the area inside the outline, the contour parameters of the outline are extracted and stored. The contour parameters are used for creating an outline mask for identifying the area enclosed within the outline, and the area within the outline is extracted by performing outline removal using a mask and the area is printed or stored.

According to exemplary embodiment in the present disclosure, a system for extracting and printing a selected area of a document, comprising a processor and memory are configured to perform reading of a received image to select the area to be printed and extracting an outline drawn with a specific colored ink around the selected area and storing the one or more extracted outline parameters to create an outline mask, retrieving the required area by performing outline removal using the mask and printing the required area.

BRIEF DESCRIPTION OF THE DRAWINGS

The accompanying drawings incorporated in and forming a part of the specification, illustrate several aspects of the present disclosure, and together with the description serve to explain the principles of the present disclosure.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, may be made without departing from the scope of the present disclosure. Examples merely typify possible variations. Portions and features of some embodiments may be included in or substituted for those of others. The following description, therefore, is not to be taken in a limiting sense and the scope of the present disclosure is defined only by the appended claims and their equivalents.

It will be further understood that each block of the example flowcharts or diagrams, and combinations of blocks in the example flowcharts or diagrams, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus may create means for implementing the functionality of each block of the diagrams or combinations of blocks in the diagrams discussed in detail in the description below.

These computer program instructions may also be stored in a non-transitory computer-readable memory that may direct a computer or other programmable data processing apparatus to function in a particular manner, such that the instructions stored in the computer-readable memory produce an article of manufacture, including an instruction that implements the function specified in the block or blocks. The computer program instructions may also be loaded onto a computer or other programmable data processing apparatus to cause a series of operational actions or steps to be performed on the computer or other programmable apparatus to produce a computer implemented process such that the instructions that execute on the computer or other programmable apparatus implement the functions specified in the block or blocks.

Figure 1:
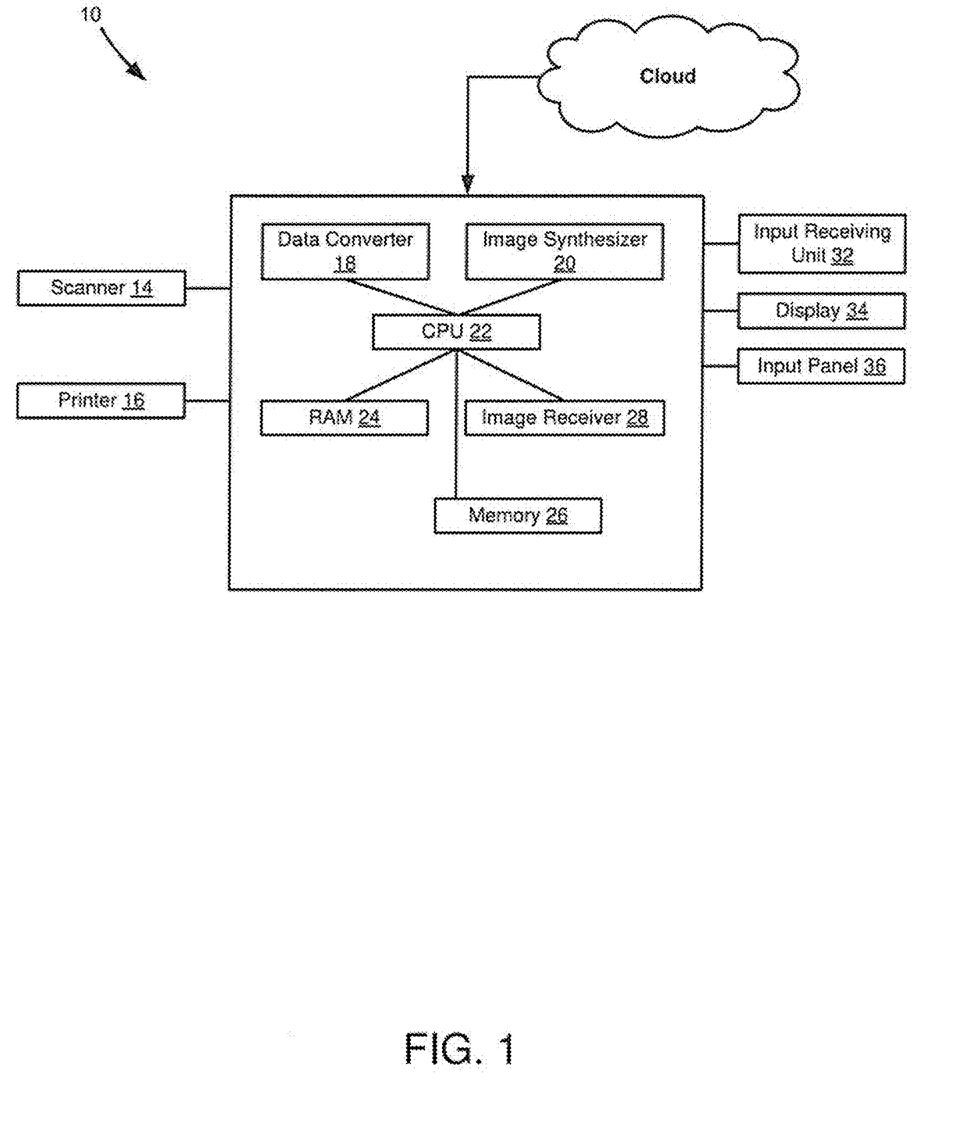
FIG. 1. is a system illustrating image printing system according to an example embodiment.

Referring now to the drawings and more particularly to FIG. 1, which shows a block diagram depiction of a printing system according to one example embodiment where the printing system comprises of a document scanner 14, a document printer 16, data converter 18, image synthesizer 20, a central processing unit or CPU 22, a RAM 24, a memory 26, an image receiver 28, an input receiving unit 32, a display unit 34 and input output panel 36. The document scanner 14 is, for example, an optical scanner which utilizes optical scanning means for copying document or is a digital camera that captures the image of the document and passes it on to the image receiver 28. The CPU 22 controls the operation of other modules/units such as data converter 18, image synthesizer 20 and read/write operations on memory 26, etc. are inter-connected for allowing data and command flow. The input receiving unit 32, display unit 34 and input output panel 36 together are responsible for capturing user input and providing output data.

The user draws one or more closed free-from outline(s) on the document using pen or marker with same or different colors for enclosing one or more section(s) the user wants to print. Then, user copies this document using the scanner 14. In this and other exemplary embodiments, before or after copying the document, the user selects an option to enable outlined area(s) extraction. The user can specify or select from a list, the color of the pen(s) or marker(s) used for drawing the outline(s). The outline color values relate to a specific color either natural or unnatural known in the art, for example, the drawn outline color is, a pre-decided color or color selected from a list of colors available for selection in the printing system by default or based on customizable settings.

The user draws one or more closed free-form outline(s) on the desired area(s) and selects the outline color for performing printing action. The user can draw free-flowing closed outlines of different colors and provide this information to perform printing of the area(s) outlined in different colors for selectively printing on different pages or simply choose to print the area(s) inside different color outlines in a recursive or back-to-back printing style.

The color(s) used for indicating area for printing can have a default setting, for example, a first default color is for example, red color and a second and third default colors are blue and green, respectively. The printing styles can also be set in default mode for printing the different areas. In the exemplary embodiment document scanner 14 reads input document and stores the image in memory 26 as an 'original template'. The original template contains color information of the input document. The size of the image and original template stored in memory 26 is same and any further copy of original template, as discussed below, are also of the same size as that of the original template. The color space value in the original template, for example, is further synthesized and converted in the system 10.

When user triggers a printing operation, a small intelligent image processing application is invoked within the system 10. The intelligent application detects and extracts the outlined area(s) from the document and prints using the printer 16, only those area(s) inside outline(s), leaving out the rest of the content outside the outline(s). Particularly, the intelligent application detects the contour parameters of the outline(s) and applies a series of masks to the input image and its intermediate transformations to extract the area(s) inside one or more outline(s). In the exemplary embodiments, the one or more outline(s) are drawn in a free-flow manner by the user using color marker or pen of same or different color, as the color value of the outline contour may vary over different sections of the outline—various shades of the outline(s) color are identified. For identifying the outline color, the stored original template of the document is converted by image synthesizer 20 in to Hue-Saturation-value (HSV) color space format, with the help of data converter 18. For identifying the outline from the HSV color space format of the document, the CPU 22 identifies color shades of the outline, for example as lower hue and saturation values (lr) of the outline and upper hue, saturation values (ur) of the outline and stores the variance in color shades of the outline in the memory.

Figure 6:
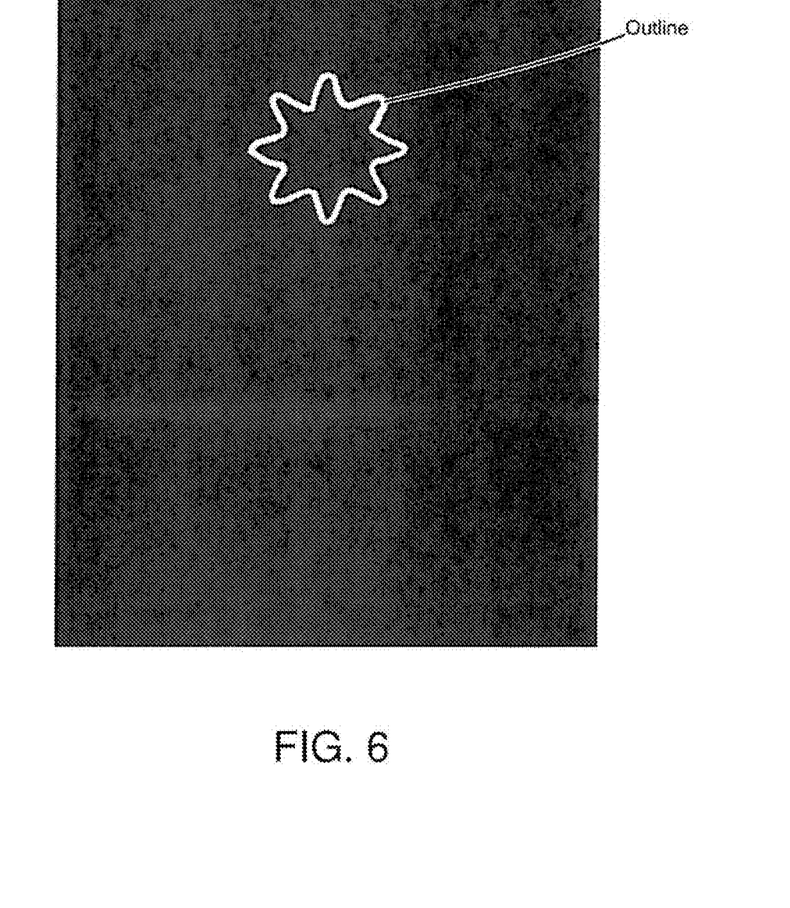
FIGS. 6-11 are intermediate image templates processed and saved for processing for printing.
Figure 7:
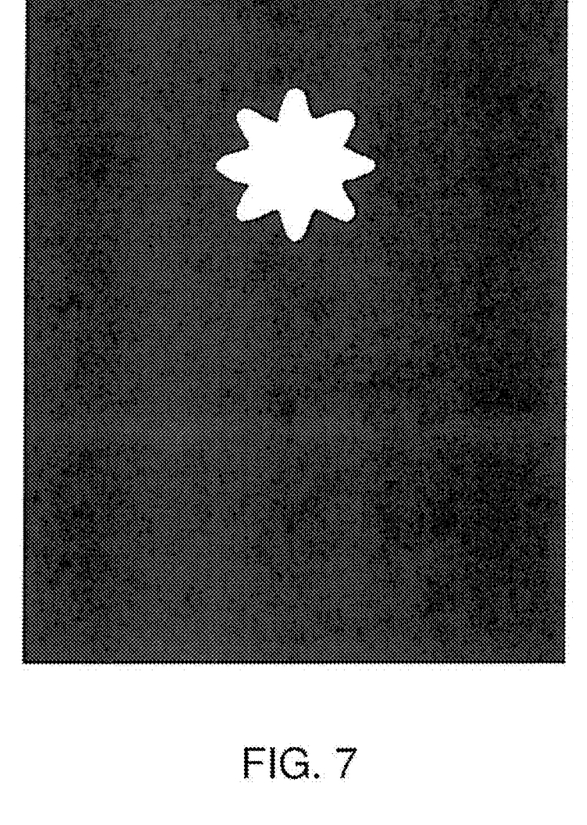

Thereafter, a mask of the outline 'mask_border', as seen in FIG. 6, is created using the upper and lower value of the outline hue and saturation values stored in the memory. Here, the mask refers to a binary matrix having the same width and height as the input image or original template and a value 1 denoting pixels that have color lying within a specified range. Needless to mention, a value 0 in the matrix denote pixels that does not contain a color lying within the given range. The CPU 22 finds the external contour of 'mask_border' and fills the area inside the contour with color of the outline and stores it as 'temphsv' template. For finding the external contour of 'mask_border', a chain approximation Algorithm may be utilized for determining the contour points, for example Suzuki85 chain approximation, Fast Fourier chain Approximation, Markov chain approximation algorithm, etc. The 'temphsv' is drawn on a copy of original image and then converted to HSV color space. Thus drawing the area inside the outline with the outline, and filled with color of the outline. The CPU 22 also creates another binary mask 'mask_fill' from 'temphsv' using the outline color stored in the memory. This mask is seen in FIG. 7.

Figure 8:
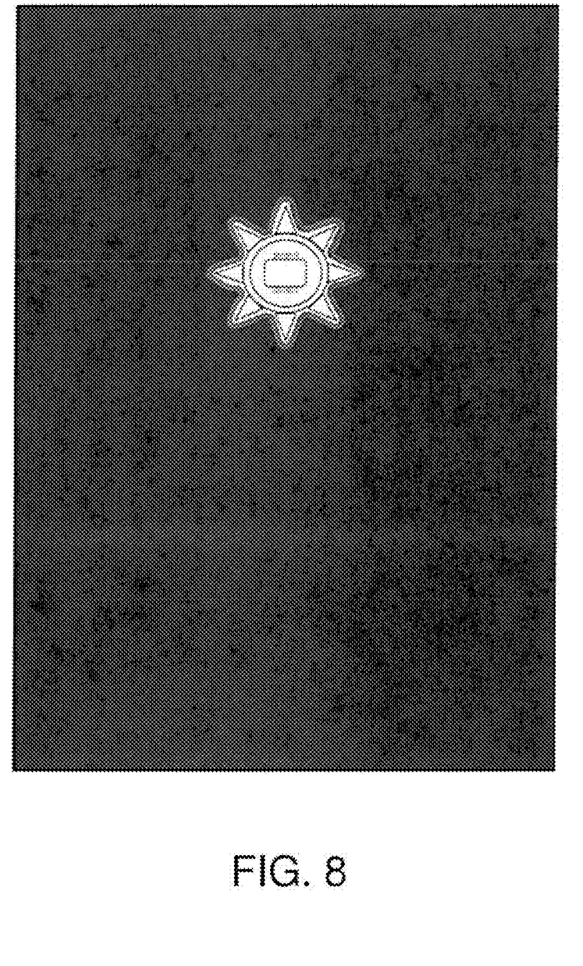

Thereafter CPU 22 perform logical bitwise or pixel-wise logical AND(ing) between a copy of the original image and the mask 'mask_fill', both stored in memory 26. The bitwise or pixel-wise logical operation leads to copying of area inside the outline and the outline, which is saved as variable 'out'. The logical AND(ing) operation is seen in FIG. 8. Thereafter, for removing the outline and extracting only the area inside the outline, a mask containing only the outline is first processed and stored. In this regard, for which each pixel or bit of the mask_border stored in memory, a logically inverted or logical NOT operation is performed and the resulting mask only template is stored as 'mask_border_inv' in memory 26. An exemplary template 'mask_border_inv' can be seen in FIG. 9.

Figure 10:
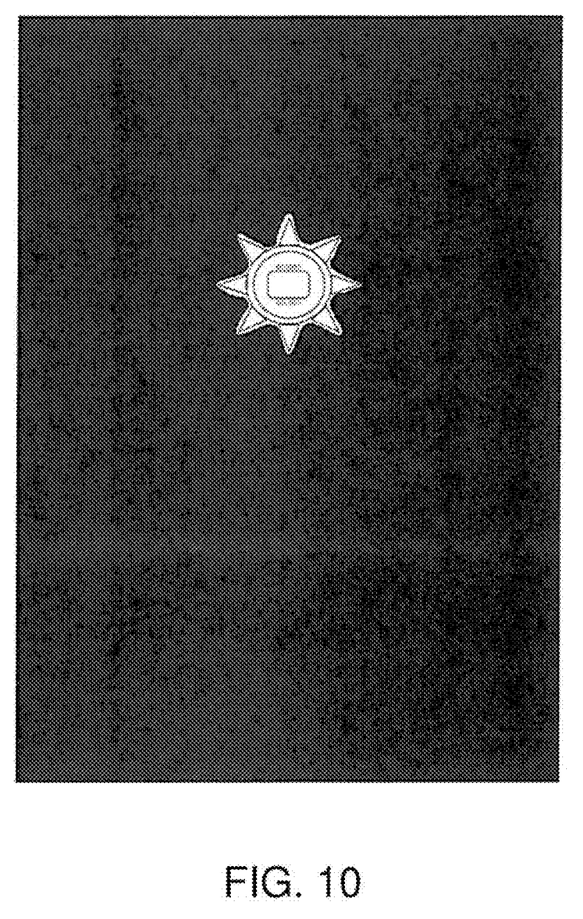

Thereafter, each pixels of the mask only template stored as mask_border_inv from the memory is logically AND(ed) with the each pixel of stored copy of 'out' to obtain only the area inside the outline. The area inside the outline thus obtained is stored in variable 'out' which contains the area inside the outline and excludes the outline but the rest of the image is black as pixels laying outside the outline has value 0, as may be seen in exemplary sample template shown in FIG. 10. A white background needs to be imposed on the black area (area outside the outline) of 'out'. For doing that, a background image with all white pixels and having the same size as the original image is created and stored as template 'bg' in memory 26.

Figure 11:
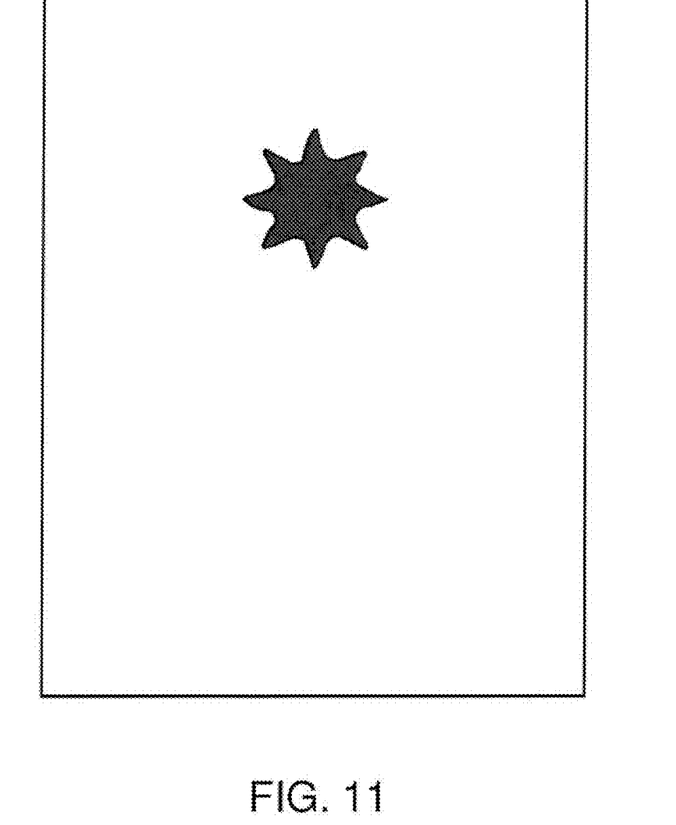
Figure 12:
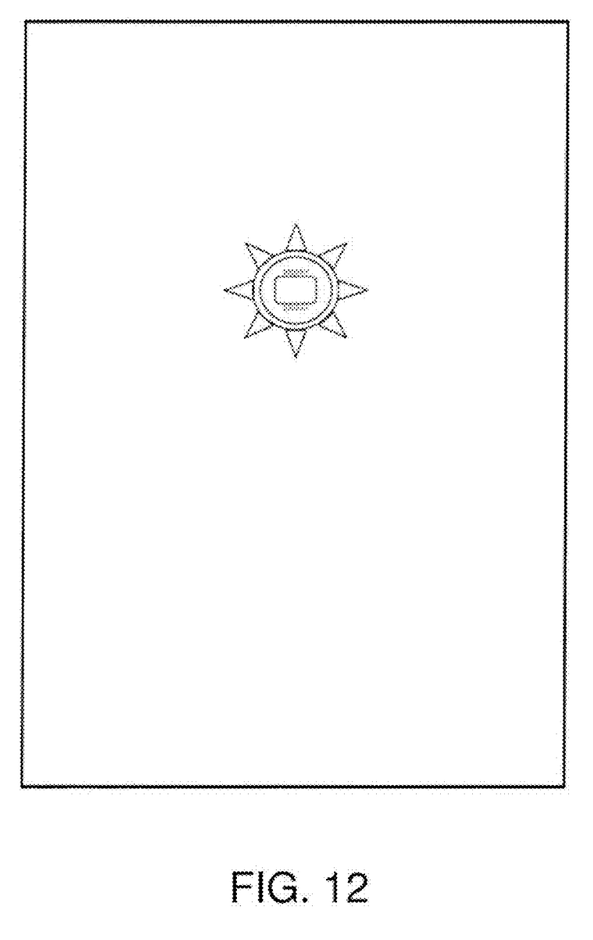
FIG. 12 is an exemplary output image produced after the printing process.

For converting the black background, a bitwise logical AND(ing) operation between mask_fill and 'mask_border_inv' is performed followed by a bitwise logical NOT operation on the result and which is then stored in a mask 'mask_bg_inv'. This is the mask of the area lying outside the outline, including the outline as seen in FIG. 11. Thereafter, format of 'mask_bg_inv' template is converted to BGR (Blue green Red) format image, stored in variable mask_bgr; bit-wise or pixel-wise logical AND operation of stored bg, and mask_bgr template is performed to obtain the actual background image stored as 'bg' in memory 26 that has all white pixels except in the outlined area.

Figure 2:
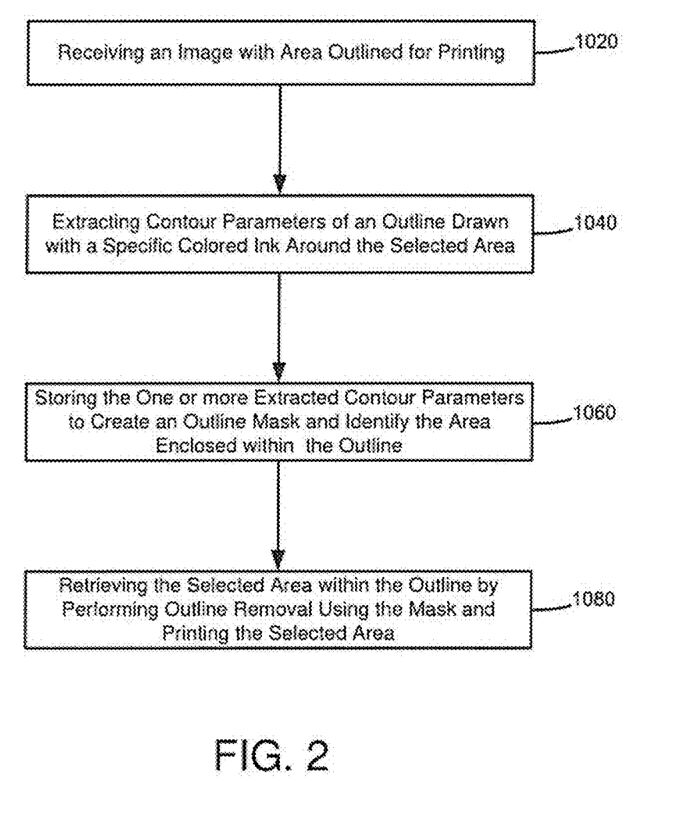
FIG. 2 is a flow chart illustrating a sequence for producing a cropped image in the printing system according to the present embodiment.

Finally for obtaining the area inside outline with a white background, CPU 22 performs bitwise or pixel-wise logical OR operation on the template out and bg to get a final output image containing the area inside the marked outline. The final output image is either printed out, saved for later use in a file. If the user is using the printing services disclosed above, or as a cloud service then the final output image is stored, sent to the user, or printed on a designated printer that is part of the cloud service. The operation of the exemplary system is now described with reference to flow chart of FIG. 2, where at block 1020 an image for processing is received, where the area for printing is marked inside an outline of a color specified by the user. At block 1040, the contours of the outline are extracted, at block 1060 one or more extracted contour parameters stored are used to create an outline mask to identify the area enclosed within the outline, at block 1080 the area within the outline is selected and extracted by performing outline removal using the outline mask and the area is printed.

Figure 3:
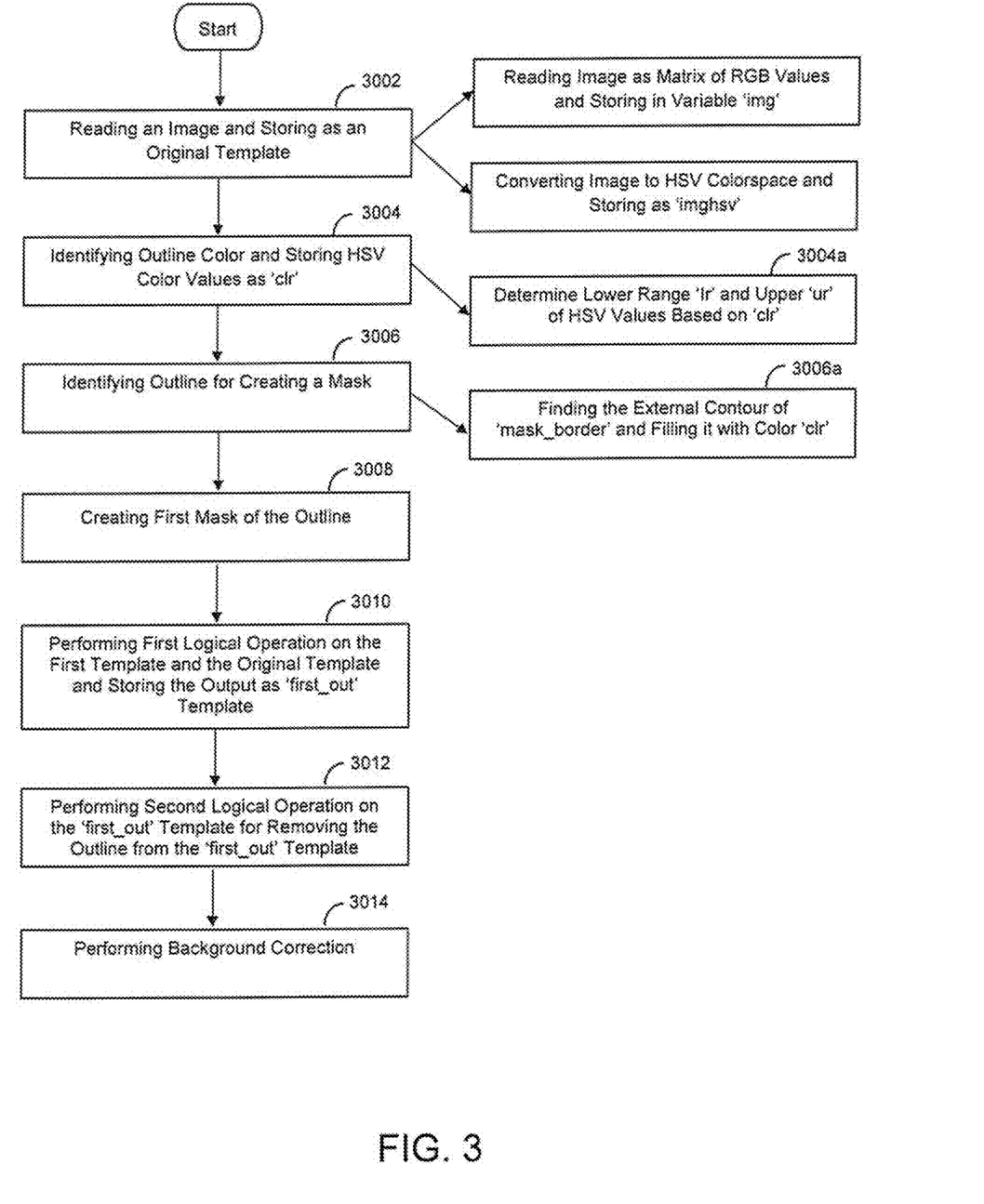
FIG. 3 is a flow chart illustrating a sequence for producing a cropped image in the printing system according to the present embodiment.

The operation of the exemplary system is now described with reference to flow chart of FIG. 3. At block 3002, a received document is read and stored as original template of received document. At block 3004 identification of the outline color is performed and stored as HSV color values 'clr', by identifying various shades of the outline color. At block 3004A, the CPU 22 identifies color shades of the outline, for example as lower hue and saturation values (lr) of the outline and upper hue, saturation values (ur) of the outline and stores the variance in color shades of the outline in the memory. At block 3006, the outline is identified and stored as a binary matrix 'mask_border', by identifying pixels lying within the color range of lr and ur values obtained. For finding the external contour of mask_border and filling it up with clr, at block 3006a, a chain approximation Algorithm may be utilized for determining the contour points, for example Suzuki85 chain approximation, Fast Fourier chain Approximation, Markov chain approximation algorithm, etc.

At block 3008, a first mask of the outlined area is generated. It is a mask of the outlined area that is filled using identified color dr of the outline on a template, which is of the size of the original template. Here, the mask refers to a binary matrix that has the same width and height as the input image or original template and a value 1 denoting pixels that have color lying within a specified range. At block 3010, a first logical AND(ing) operation is performed on pixels or bits of the first template and a copy of the original template, stored in memory 26 as 'first out' template. The 'first out' consists of area inside the outline and the outline.

Figure 9:
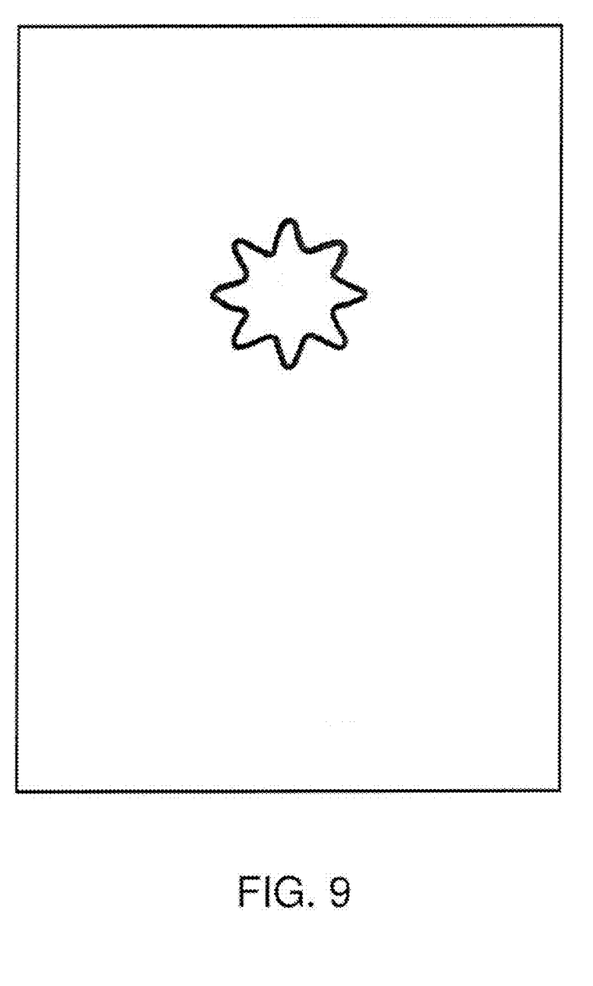

At block 3012, a second logical operation is performed on 'first out' template to remove the outline and extract only the area inside the outline. For which a mask containing only the outline is first processed and stored, for which each pixel or bit of the mask_border is logically inverted or logical NOT operation is performed on the bits and the resulting mask only template is stored as 'mask_border_inv' in memory 26, as shown in FIG. 9. Thereafter, each pixels of the mask only template stored as mask_border_inv from the memory is logically AND(ed) with the each pixel of stored first out to obtain only the area inside the outline. The area inside the outline thus obtained is stored in variable 'out'. 'Out' template contains the area inside the outline. Where at block 3014, the area outside the outline is filled with white color and the bits of the template are logically OR(ed) with 'out' template to generate an output image for printing or sending to Cloud-based application for printing at a later stage. The operation of an exemplary device is now described with reference to FIG. 4.

Figure 4:
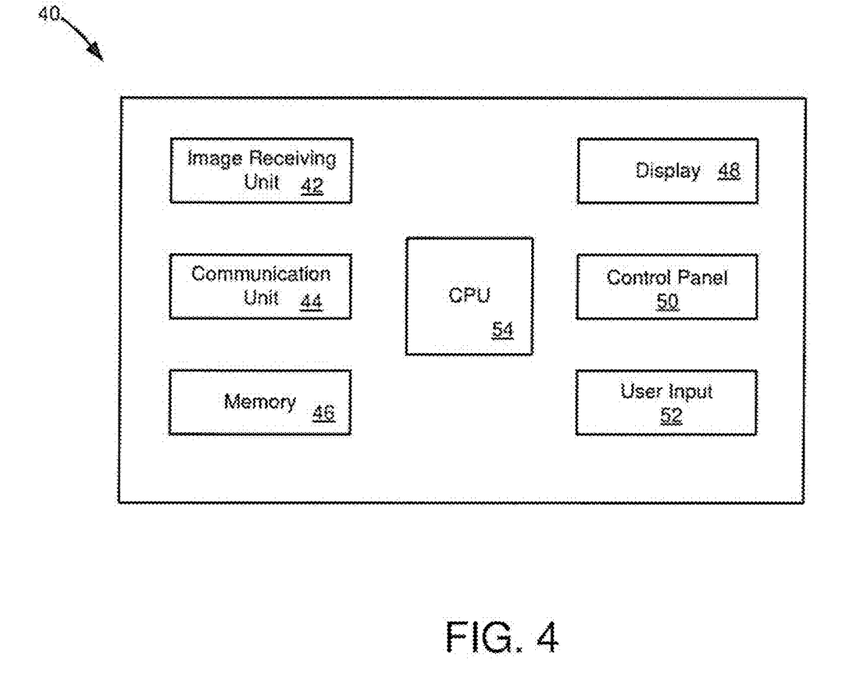
FIG. 4 is an exemplary device for producing a cropped image according to the present embodiment.
Figure 5:
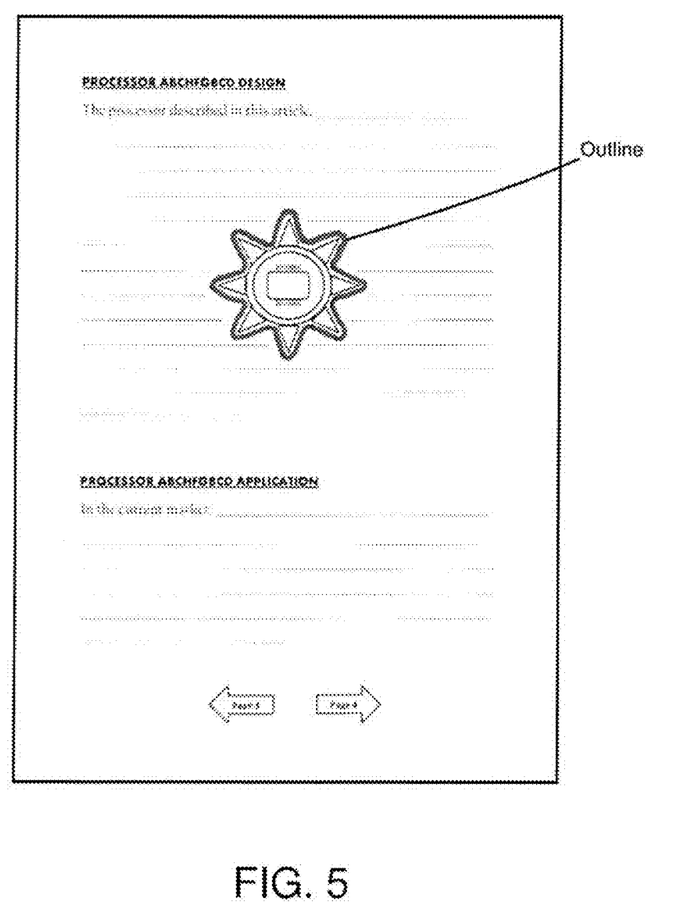
FIG. 5 is an exemplary input image received for printing.

Referring to FIG. 4, an image scanner or printing station, designated as 40 is shown. The station 40 comprises, an image receiving unit 42, which can be a scanner for optically scanning the document or the image can be received as a digital copy. The station 40 also comprises of a communication unit 44 for performing communication with other device or cloud service, a memory 46 for storing the received image or storing scanned copy of the document, where the memory 46 is also used for storing intermediate transformation of the received image, and a display 48 in the station 40 that is used for invoking cropping function. The user also utilizes the display 48, control panel 50, and user input panel 52 for invoking the cropping action. The user also provides information about color used for writing the outline. The station 40 consists of CPU 54 which controls the operation of the station and received user input and other input. Using the station 40, from the received image and outline marking the area for printing is identified. After the color identification, the contour information of the outline is identified using, for example, Suzuki85 algorithm, Fast Fourier extraction algorithm, etc. The outline parameter extraction includes extracting point on the outline and drawing the outline on intermediate transformation of the received image for printing. In station 40 based on user input, the area for printing is printed or sent to a remote station for printing or storing via communication unit 44.

In the above exemplary embodiments, the outline(s) are written or drawn with a specific colored ink, around the area. The received image or original is stored or transformed into a matrix of RGB (Red-Green-Blue) color space values, which is converted and stored as a version representing the RGB matrix as HSV color space values. In the above exemplary embodiments, the determination of the variance in color of the outline comprises determining a lower range HSV value (lr) and upper range of HSV values (ur) based on color information of the outline. The outline is drawn by drawing the contour on a template using the contour points and connecting the contours points with color information of the outline and subsequently making a series of bitwise AND/OR/NOT operations on intermediate versions of the document and the pixels of the template. Using the exemplary embodiments of the present invention, a user would not require any additional third-party software. The user can just pick up a pen, mark an outline around the section of interest, and get it copied from the copier then and there. For example, if a user has an urgent meeting and an article from a report needs to be shown in it, he can just mark an outline and get that article printed instantly.

In the exemplary embodiment, the method is hosted on a cloud platform, known in the art and provided as a web service, instead of incorporating it within the devices. In that case, the outlined document should be scanned beforehand using any color scanner device or mobile phone. When the user uploads the scanned outlined document to this Cloud-based application, he/she is prompted to specify the color of the written outline. Once the upload completes, the application would extract the outlined area. The output image can then be downloaded or sent to any connected printer for printing.

The invention claimed is:

1. A method for extracting and printing a selected area of a document, comprising:
   receiving an image to select the area for printing;
   extracting parameters of an outline drawn with a specific colored ink around the selected area, including determining a variance in color of the outline and contour information of the outline;
   storing one or more of the extracted parameters to create an outline mask to identify the selected area enclosed within the outline; and
   retrieving the selected area within the outline by performing outline removal using the outline mask and printing the selected area.

2. The method of claim 1, wherein receiving the image comprising receiving the document as an image.

3. The method of claim 1, further including using the contour information and the variance to create an outline mask.

4. The method of claim 1, wherein the received image is stored as a matrix of RGB (Red-Green-Blue) color space values, which is converted and stored as a first version representing the RGB matrix as HSV color space values.

5. The method of claim 4, further comprising, obtaining area of the original image within the outline by performing a bitwise logical-AND operation between a version of stored physical document and the pixels of a template.

6. The method of claim 1, wherein the determining the variance in color of the outline further includes determining a lower range HSV value (lr) and upper range of HSV values (ur) based on color information of the outline.

7. The method of claim 1, further comprising creating the outline mask by drawing of the contour on a first template using the contour points and connecting the contours points with color information of the outline and processing a series of bitwise AND/OR/NOT operations on intermediate versions of the document and pixels of a template.

8. A system for extracting and printing a selected area of a document, comprising a processor and memory configured to perform:
   a reader for receiving an image to select the area to be printed;
   extracting an outline drawn with a specific colored ink around the selected area, wherein the extracting the outline includes determining, by the processor, a variance in color of the outline and contour information of the outline;
   storing one or more parameters from the extracting the outline to create an outline mask; and
   retrieving the required selected area by performing outline removal using the outline mask and
   printing the required selected area.

9. The system of claim 8, wherein the reader receiving the image comprising receiving the document as an image.

10. The system of claim 8, wherein the received image is stored in the memory as a matrix of RGB (Red-Green-Blue) color space values, which is converted and stored as a first version representing the RGB matrix as HSV color space values.

11. The system of claim 10, further comprising extracting area of the original image within the outline by performing a bitwise logical-AND operation by the processor between a version of stored physical document and pixels of a template.

12. The system of claim 8, wherein the extracting of the variance in color of the outline by the processor further includes determining a lower range HSV value (lr) and upper range of HSV values (ur) based on color information of the outline.

13. The system of claim 8, further comprising extracting the outline mask by a drawing of the contour on a first template using the contour points and connecting the contour points with color information of the outline and performing a series of bitwise AND/OR/NOT operations on intermediate versions of the document and pixels of a template.

14. A device for extracting and printing a selected area of a document, comprising:
   an image receiving device that receives a document with a selected area for printing area inside an outline;
   a memory storing the received document and an intermediate version of the document thereof;
   a user input receiving an input identifying a specified color ink which is used for outlining the selected area; and
   a processing unit executing commands for identifying one or more parameters of the outline, extracting the area within the outline using the one or more parameters by creating an outline mask and printing the selected area, wherein the processing unit executing commands for identifying one or more parameters of the outline further determines a variance in color of the outline.

15. The device of claim 14, wherein the image receiving device comprising receiving the document as an image.

16. The device of claim 14, wherein the processor unit executing commands for identifying one or more parameters of the outline further identifies one or more contours of the outline.

17. The device of claim 14, wherein the processor unit executing command to store the received image as a matrix of RGB (Red-Green-Blue) color space values, which is converted and stored as a first version representing the RGB matrix as HSV color space values.

18. The device of claim 17, wherein the processor unit executing command extracting area of the original image within the outline by performing a bitwise logical-AND operation between a version of stored physical document and pixels of a template.

19. The device of claim 14, wherein the processor unit executing commands to determine the variance in color of the outline further identifies a lower range HSV value (lr) and upper range of HSV values (ur) based on color information of the outline.

20. The device of claim 14, wherein the processor unit executing command to extract the outline mask by drawing of the contour on a first template using the contour points and connecting the contours points with color information of the outline and executing a series of bitwise AND/OR/NOT operations on intermediate versions of the document and pixels of a template.

* * * * *